United States Patent [19]

Margiaria et al.

[11] Patent Number: 5,008,063
[45] Date of Patent: Apr. 16, 1991

[54] METHOD FOR PRESS MOLDING PLASTICS ARTICLES, IN PARTICULAR THERMOPLASTIC, THERMOSETTING AND POLYURETHANE PLYMERIC ARTICLES

[75] Inventors: Giorgio Margiaria, Moncalieri; Giuseppe Brizio, Fossano, both of Italy

[73] Assignee: Fiat Auto S.p.A., Turin, Italy

[21] Appl. No.: 405,791

[22] Filed: Aug. 28, 1989

Related U.S. Application Data

[62] Division of Ser. No. 118,903, Nov. 9, 1987, Pat. No. 4,861,258.

[30] Foreign Application Priority Data

Nov. 20, 1986 [IT] Italy ................................ 67862 A/86

[51] Int. Cl.$^5$ ............................................. B29C 45/04
[52] U.S. Cl. ............................ 264/297.2; 264/328.11; 425/185; 425/588; 425/575
[58] Field of Search ............. 264/297.2, 328.1, 328.11; 425/185, 233, 235, 253, 259, 261, 346, 355, 574, 575, 588, 436 R, 444, 451.6, 547, 552, 554, 556, 572, 593; 249/66 R, 161

[56] References Cited

U.S. PATENT DOCUMENTS

| | | | |
|---|---|---|---|
| 3,982,869 | 9/1976 | Eggers | 425/575 |
| 4,050,666 | 9/1977 | Van Tichelt | 425/444 |
| 4,088,432 | 5/1978 | Farrell | 425/451.6 |
| 4,139,593 | 2/1979 | Holz et al. | 425/444 |
| 4,205,950 | 6/1980 | Süss et al. | 425/575 |
| 4,439,123 | 3/1984 | Sano et al. | 425/185 |

Primary Examiner—Jill L. Heitbrink
Attorney, Agent, or Firm—Sughrue, Mion, Zinn Macpeak & Seas

[57] ABSTRACT

A press for molding thermoplastic, thermosetting, polyurethane polymeric articles includes three workstations arranged side by side and including a central molding station and two lateral stations for cooling and extracting molded articles. Two molds are rigidly connected to one another and controlled by a transfer pusher which alternately moves the molds from the molding station to either of the cooling and extraction stations. A first presser at the central molding station applies a closure pressure necessary for the material injection, while auxiliary presser arranged in each station applies a reduced secondary pressure to the molds at the end of the injection step, during the translatory motion of the mold and during the cooling step.

1 Claim, 2 Drawing Sheets

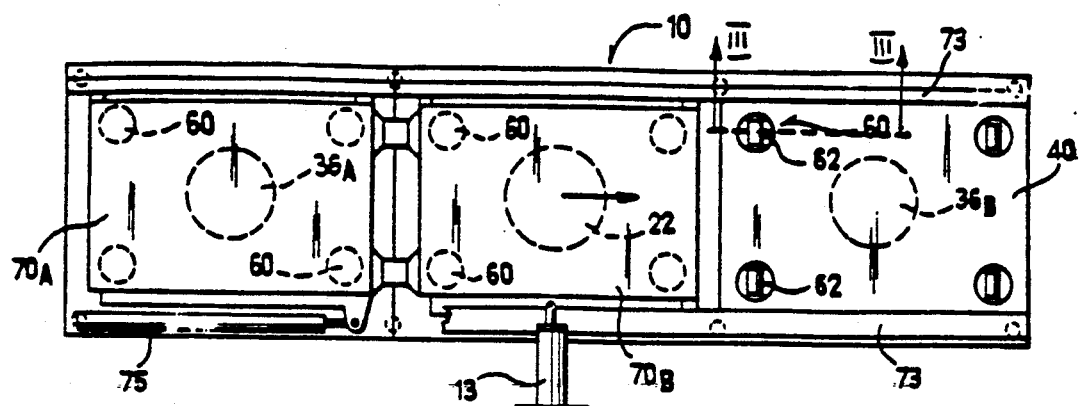
Fig. 1
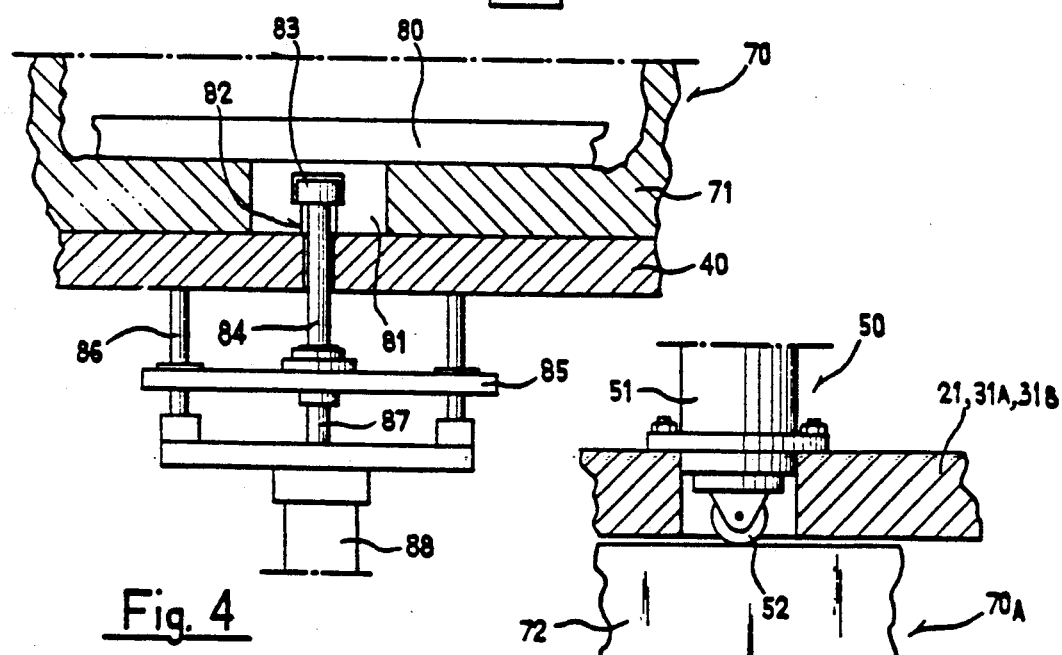
Fig. 4
Fig. 3

METHOD FOR PRESS MOLDING PLASTICS ARTICLES, IN PARTICULAR THERMOPLASTIC, THERMOSETTING AND POLYURETHANE PLYMERIC ARTICLES

This is a Division of application Ser. No. 07/118,903 filed Nov. 9, 1987 now U.S. Pat. No. 4,861,258 issued Aug. 29, 1989.

BACKGROUND OF THE INVENTION

The present invention relates to a press and a method for molding thermoplastics, thermosetting, and polyurethane polymeric articles.

In the present description, the term "molding" refers to both known methods of injection and injection-compression of fluid polymeric material using thermostat-fitted shell molds.

As is known, the current molding technology employs hydraulic presses with a fixed base and a movable plate accommodating therebetween the mold which receives the closing pressure from the movable plate which is subject to the action of one or more fluidodynamic jacks capable of exerting considerable stresses, for example comprised between 2500 and 3500 tons.

The molding process essentially consists of the following operative steps:
 (a) closure and locking of the mold by clamping the same between the base and the movable plate
 (b) advancement of the carriage bearing the injection machine
 (c) injection
 (d) return of the carriage
 (e) unlocking
 (f) waiting
 (g) translatory motion and opening of the mold.

During the steps (d) to (g), cooling of the molded article occurs, thereafter the mold is opened and the article is extracted. Cooling is performed while maintaining on the mold a reduced closing pressure required for the correct execution of said operative step.

The cooling time, which substantially lasts from the end of the injection step to the opening of the mold, is considerable, generally comprised between two and three times the time required by the injection step, and is a dead time which considerably affects plant productivity and therefore the cost of the finished product.

If the articles to be molded are small, one tries to contain the negative effect of the cooling time by using multiple molds so that the dead cooling time is divided among the several articles obtained with a single molding.

This manner of molding—which besides entails a considerable increase in the cost of the mold—is not applicable in case of large articles, such as bumpers for automotive vehicles, dashboards and the like, since the molds, the presses and the injection machines would assume prohibitive costs and dimensions which are absolutely incompatible both with the movement requirements and with the economy of company management.

SUMMARY OF THE INVENTION

The aim of the present invention is to eliminate these disadvantages, and in particular to provide an improved press and a method involving a considerable reduction of the cooling dead times during molding of large articles, with a consequent considerable increase in the productivity of the work cycles and without negative effects on the cost of the molds.

This aim and other objects, which will become apparent from the following detailed description, are achieved by the improved press and method, as defined in the claims.

BRIEF DESCRIPTION OF THE DRAWINGS

The characteristics and advantages of the invention will become apparent from the following detailed description and with reference to the accompanying drawings, given only by way of non-limitative example, wherein:

FIG. 1 is a schematic plan view of the improved press according to the present invention;

FIG. 3 is a partial, enlarged-scale schematic cross section view taken along line III—III of FIG. 1; and FIG. 4 is an enlarged-scale cross section view taken along line IV—IV of FIG. 2.

DESCRIPTION OF THE PREFERRED EMBODIMENTS

Figure 2:
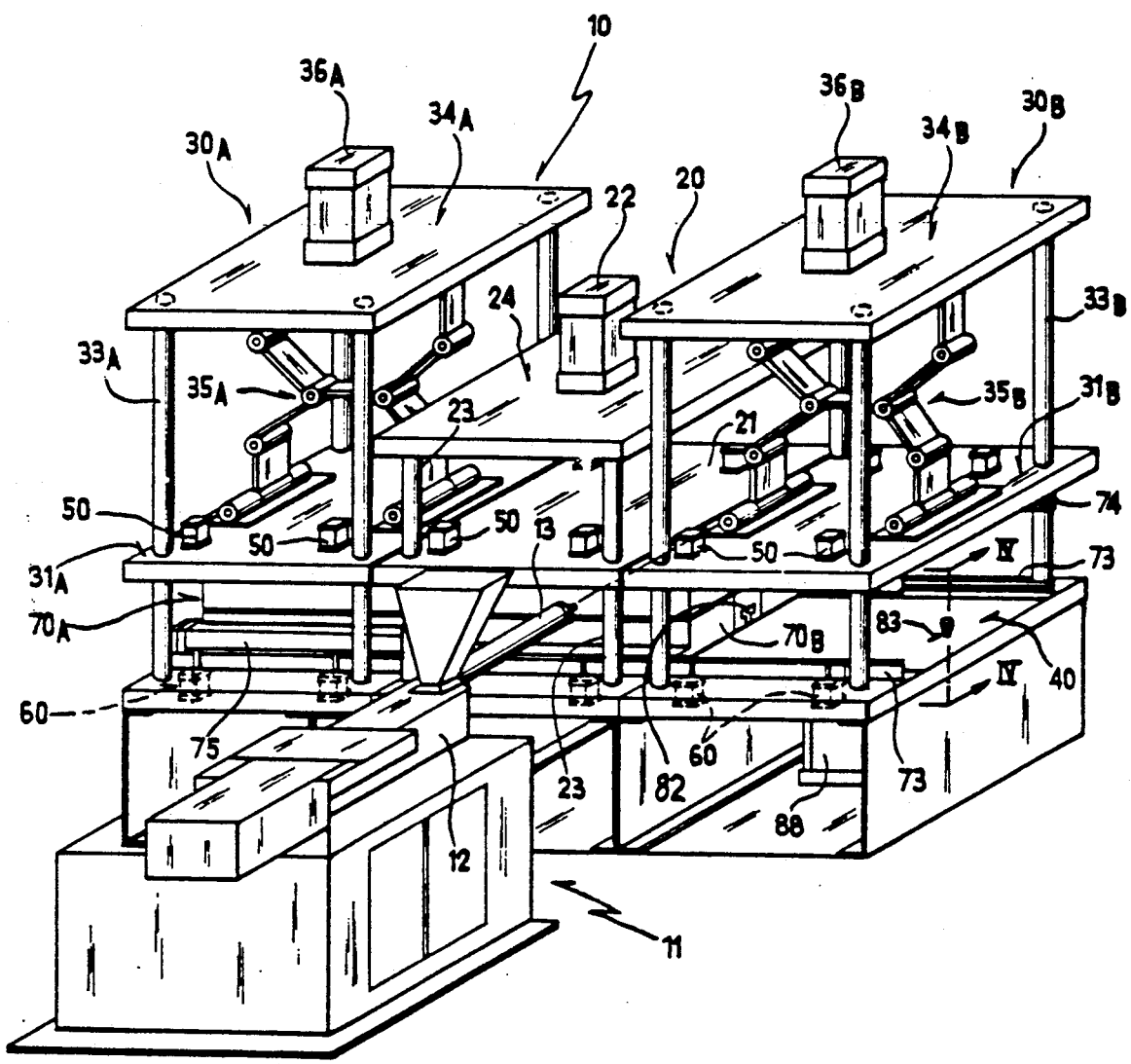
FIG. 2 is a perspective view of said press.

In the drawings, 10 generally indicates the press and 11 indicates the carriage bearing the injection machine 12. The press 10 is formed by a sturdy framework wherein three workstations are defined, consisting of a central molding station 20 and of a pair of lateral stations 30A—30B in which cooling and extraction of the finished articles occur alternately, as will be described in detail hereinafter. The carriage 11 is aligned with the central station 20 and is susceptible to move orthogonally with respect to the framework 10 from a resting position (shown in FIG. 2) to a working position in which the injector nozzle 13 is inserted in the corresponding injection channel of the mold.

The framework 10 comprises a base 40 common to the three stations and a set of three movable plates, respectively a central one 21 and lateral ones 31A—31B. The stem of a fluidodynamic jack 22 acts on the central plate 21 of the injection station 20, and is adapted to transmit to said plate the mold closing pressure required in the injection step; the jack 22 having such dimensions as to produce a stress comprised between 2500 and 3500 tons. The plate 21 is vertically slideable along guiding and retention columns 23 which are part of the framework 10 and the cylinder of the jack 22 is rigidly connected to a fixed reaction plate 24 which in turn is rigidly associated with the ends of the columns 23.

Similarly, the movable plates 31A—31B are vertically slideable on corresponding guiding and retention columns 33A—33B of the framework 10, at the ends whereof fixed reaction plates 34A—34B are provided. Between the latter and the corresponding movable plates 31A—31B, toggle linkages 35A—35B (or mechanical or electromechanical actuators) are provided and are intended to cause opening of the mold. The stem of a corresponding fluidodynamic jack 36A—36B acts on the central connecting rod of each linkage and is adapted to deformate the latter in order to vertically shift the movable plate and is also adapted to absorb and transmit to the corresponding fixed plate 34A—34B the reaction which acts onto the movable plate due to the action of auxiliary presser means generally indicated at 50 and 60 and adapted to apply to the mold a reduced secondary pressure.

The auxiliary presser means 50 are provided on each movable plate 21, 31A—31B substantially at each corner, and the auxiliary presser means 60 are provided on each portion of plate forming the base 40 and are aligned with the means 50. Said auxiliary presser means 50, 60 (see FIG. 3) are each composed of a fluidodynamic jack with a cylinder 51, respectively 61, rigidly associated with the related movable plate 21, 31A or 31B and respectively with the base 40, and of a stem, passing through a hole in the plate, respectively of the base, at the end whereof a rotary friction presser element, advantageously a presser roller 52, respectively 62, is supported freely rotatable.

In the position shown in the drawing, two movable molds 70A—70B are inserted between the base 40 on one side and the movable plate 21 of the central station 20 and the movable plate 31A of a lateral station 30 on the other side. The molds 70A, 70B are rigidly associated with one another and are each formed by a lower half-shell 71 and by an upper half-shell 72. The lower half-shells 71 are slideably movable with respect to the base 40, being guided in their translatory motion by inverted L-shaped profiled elements 73 rigid with said base. Similarly, the upper half-shells 72 are slideably movable with respect to the movable plates 21, 31A, 31B being guided in their translatory motion by profiled elements 74 rigid with each movable plate. At least one movement actuator, advantageously a fluidodynamic pusher 75 (see FIG. 1), is provided on the base 40 to alternately provide the translatory motion of the molds from the central injection station 20 to one or the other of the lateral stations 30A, 30B.

Each mold may be fitted with an extractor which can be provided completely on each mold in a known and conventional manner, or can cooperate with means arranged on the base of the framework at each lateral station to achieve the extraction of the finished article only when the mold is moved to said station.

In the second case, the extraction element 80, provided on the bottom of the mold cavity (see FIG. 4, where 70 indicates both the molds 70A, 70B), has a stem 81 which traverses the lower half-shell 71 to make contact with the base 40. A blind longitudinal groove 82 is provided on the stem 81 (see also FIG. 1), and its upper part is undercut in profile so as to accommodate a counter-shaped head 83 of a rod 84 for raising the extractor. The rod 84 in turn passes through the base 40 and is rigidly associated, at its lower part, with a plate 85 which is vertically slideable along guiding and retention columns 86. The plate 85 is connected to the stem 87 of a fluidodynamic jack 88 adapted to move the plate 85 and thus the rod 84 from a lowered resting position to a raised extraction position. In its resting position, the head 83 of the rod is aligned with the undercut portion of the groove 82 so that when the mold is moved to a lateral station, the head 83 of the corresponding transfer rod 84 engages in the aforesaid groove.

Moreover, the molds 70 may be provided with lever-type locking means of a per se known kind adapted to replace the action of the auxiliary presser means 50 and 60 above described, though said auxiliary presser means are a preferred embodiment of the invention.

The above described press operates as follows.

At the beginning of the cycle, when both molds are empty, the same are arranged one at the central injection station 20 and the other at one of the lateral stations, for example at the lateral station 30A as illustrated in FIG. 2. The jacks 22 and 36A are actuated, and jack 22 applies to the mold 70B the closing pressure required for injection, while jack 36A causes closure of the mold 70A. Subsequently the polymeric material is injected into the mold 70B. Once the injection has been completed, the injection carriage 11 is moved backwards and the auxiliary presser means 50 and 60 are actuated, while the pressure of the jack 22 is reduced to a value sufficient to oppose the reaction exerted by the auxiliary presser means on the corresponding movable plates 21, 31A. Now the mold transfer pusher 75 is actuated. The mold 70B is thus transferred to the lateral station 30B while the mold 70A is transferred to the central injection station. During said translatory motion, the presser means 50 and 60 maintain on the mold 70B the auxiliary closing pressure, the value whereof is comprised between 15% and 25% of the closing pressure for injection (said auxiliary closing pressure being greater—for example up to 50% of the injection closure pressure—in the case of use of lever-type mold locking means). A new injection cycle thus begins in the mold 70A while the mold 70B, still subject to the abovesaid auxiliary pressure imparted thereto by the presser means of the plate 31B, cools down.

Once cooling is over, the plate 31B is actuated, after deactivating the related auxiliary presser means, to open the mold 70B and the extractor elements are actuated and extract the finished article. The plate 31B is subsequently lowered again and the molds are moved in the opposite direction so that the mold 70A is transferred into the cooling station 30A and the mold 70B is transferred into the central injection station 20 for another molding cycle.

It is obvious that the press described and its operating method allow a substantial reduction of cooling dead times, since most of the cooling period is employed to inject into the adjacent mold; the overall gain in productivity (in terms of the amount of articles produced per unit time) being in the order of 75%.

Naturally, the concept of the invention being invariant, the details of the execution and the shapes of the embodiment may be extensively varied with respect to what is described and illustrated by way of non-limitative example, without thereby abandoning the scope of the invention.

We claim:

1. A method for molding plastic articles comprising:
   arranging a first mold at a central molding station and a second mold at one of two cooling and extraction stations located adjacent said molding station on opposite sides thereof,
   simultaneously molding an article in said first mold at the central station while applying a pressure by a first pressure applying means and cooling and extracting a molded article from said second mold at said one of two cooling and extraction stations,
   positioning second pressure applying means to define an elongated transfer path for said first and second molds,
   applying a closure pressure to the molds by means of said second pressure applying means,
   moving the molds relative to said second pressure applying means to maintain said closure pressure to bring the second mold into the central molding station and the first mold into another of the two cooling and extraction stations, and
   alternately repeating the above operations by shifting the respective molds simultaneously back and forth between the molding stations and the respective cooling and extraction stations.

* * * * *